(12) United States Patent
Bookbinder et al.

(10) Patent No.: US 9,891,379 B2
(45) Date of Patent: Feb. 13, 2018

(54) OPTICAL FIBER COATING COMPOSITIONS WITH ACRYLIC POLYMERS

(71) Applicant: CORNING INCORPORATED, Corning, NY (US)

(72) Inventors: Dana Craig Bookbinder, Corning, NY (US); Kevin Robert McCarthy, Horseheads, NY (US); Weijun Niu, Painted Post, NY (US); David Neal Schissel, Painted Post, NY (US); Arthur Lawrence Wallace, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/934,935

(22) Filed: Nov. 6, 2015

(65) Prior Publication Data
US 2016/0139331 A1   May 19, 2016

Related U.S. Application Data

(60) Provisional application No. 62/079,746, filed on Nov. 14, 2014.

(51) Int. Cl.
| | |
|---|---|
| *G02B 6/02* | (2006.01) |
| *C03C 25/10* | (2006.01) |
| *C09D 4/06* | (2006.01) |
| *C09D 133/08* | (2006.01) |

(52) U.S. Cl.
CPC ...... *G02B 6/02395* (2013.01); *C03C 25/1065* (2013.01); *C09D 4/06* (2013.01); *C09D 133/08* (2013.01)

(58) Field of Classification Search
CPC .......................................................... G02B 6/02
USPC ........................................................... 385/128
See application file for complete search history.

(56) References Cited

U.S. PATENT DOCUMENTS

| | | | | |
|---|---|---|---|---|
| 3,951,657 | A | * 4/1976 | Recchia | C08F 283/006 430/288.1 |
| 4,076,380 | A | 2/1978 | DiMarcello et al. | |
| 4,176,911 | A | 12/1979 | Marcatili et al. | |
| 4,254,209 | A | * 3/1981 | Abe | G03F 7/0955 101/456 |
| 4,300,930 | A | 11/1981 | Chang | |

(Continued)

FOREIGN PATENT DOCUMENTS

| | | |
|---|---|---|
| CN | 101906235 A | 12/2010 |
| CN | 101654571 A | 9/2011 |

(Continued)

OTHER PUBLICATIONS

Cameron, D., et al., "Aliphatic polyester polymer stars: synthesis properties and applications in biomedicine and nanotechnology", Chem. Soc. Rev., vol. 40, Issue 3, pp. 1761-1776, Mar. 1, 2011.

(Continued)

*Primary Examiner* — Kaveh C Kianni
(74) *Attorney, Agent, or Firm* — John P. Ciccarelli

(57) ABSTRACT

An optical fiber coating composition is provided. The optical fiber coating composition includes a radiation-curable component, a photoinitiator, and an acrylic polymer having at least one benzophenone group.

12 Claims, 1 Drawing Sheet

(56) References Cited

U.S. PATENT DOCUMENTS

| | | | |
|---|---|---|---|
| 4,373,009 A * | 2/1983 | Winn | A61L 27/34 427/412.1 |
| 4,391,686 A | 7/1983 | Miller et al. | |
| 4,402,570 A | 9/1983 | Chang | |
| 4,439,008 A | 3/1984 | Joormann et al. | |
| 4,474,830 A | 10/1984 | Taylor | |
| 4,486,212 A | 12/1984 | Berkey | |
| 4,581,165 A | 4/1986 | Frank et al. | |
| 4,585,162 A | 4/1986 | Evans | |
| 4,752,112 A | 6/1988 | Mayr | |
| 4,921,880 A | 5/1990 | Lee et al. | |
| 4,962,992 A | 10/1990 | Chapin et al. | |
| 5,104,433 A | 4/1992 | Chapin et al. | |
| 5,188,864 A | 2/1993 | Lee et al. | |
| 5,242,963 A | 9/1993 | Mao | |
| 5,323,191 A | 6/1994 | Firtion et al. | |
| 5,410,567 A | 4/1995 | Brundage et al. | |
| 5,486,378 A | 1/1996 | Oestreich et al. | |
| 5,554,665 A * | 9/1996 | Tateosian | A61C 13/20 264/17 |
| 5,665,823 A * | 9/1997 | Saxena | C08F 8/26 428/34 |
| 5,729,645 A | 3/1998 | Garito et al. | |
| 5,997,682 A | 12/1999 | Goodman et al. | |
| 6,027,062 A | 2/2000 | Bacon et al. | |
| 6,319,603 B1 | 11/2001 | Komiya et al. | |
| 6,563,996 B1 | 5/2003 | Winningham | |
| 6,579,914 B1 | 6/2003 | Gantt et al. | |
| 6,689,463 B2 | 2/2004 | Chou et al. | |
| 6,775,451 B1 | 8/2004 | Botelho et al. | |
| 6,810,187 B2 | 10/2004 | Fabian et al. | |
| 7,565,820 B2 | 7/2009 | Foster et al. | |
| 7,832,675 B2 | 11/2010 | Bumgarner et al. | |
| 8,053,486 B2 | 11/2011 | Hsu et al. | |
| 8,093,322 B2 | 1/2012 | Hancock, Jr. et al. | |
| 8,334,052 B2 | 12/2012 | Gruber et al. | |
| 2001/0008906 A1 | 7/2001 | Chawla | |
| 2003/0003368 A1 * | 1/2003 | Lee | C08F 222/1006 429/303 |
| 2003/0060588 A1 | 3/2003 | Jacobine et al. | |
| 2003/0095770 A1 | 5/2003 | Fewkes et al. | |
| 2003/0123839 A1 | 7/2003 | Chou et al. | |
| 2003/0143523 A1 * | 7/2003 | Kato | B01J 19/0046 435/4 |
| 2003/0153070 A1 * | 8/2003 | Nakajima | B01J 19/0046 435/287.2 |
| 2006/0058472 A1 * | 3/2006 | Anzures | C08F 220/28 525/489 |
| 2007/0010651 A1 * | 1/2007 | Finch | C08G 63/685 528/310 |
| 2007/0088145 A1 | 4/2007 | Mgaya et al. | |
| 2007/0207186 A1 * | 9/2007 | Scanlon | A61F 2/07 424/424 |
| 2007/0254005 A1 * | 11/2007 | Pathak | A61K 35/12 424/423 |
| 2008/0226916 A1 | 9/2008 | Steeman et al. | |
| 2008/0226919 A1 | 9/2008 | Hosoda et al. | |
| 2008/0274245 A1 * | 11/2008 | Lee | B32B 7/12 426/394 |
| 2009/0093601 A1 * | 4/2009 | Evans | C08F 220/14 526/204 |
| 2009/0272950 A1 | 11/2009 | Lu et al. | |
| 2009/0280329 A1 | 11/2009 | Rukavina et al. | |
| 2010/0124398 A1 | 5/2010 | Murphy et al. | |
| 2010/0189941 A1 * | 7/2010 | Funakoshi | B41C 1/05 428/35.8 |
| 2010/0255321 A1 * | 10/2010 | Jahns | C08F 2/24 428/451 |
| 2011/0033663 A1 * | 2/2011 | Svec | C08F 220/18 428/141 |
| 2011/0095770 A1 | 4/2011 | Kurashima | |
| 2011/0300367 A1 | 12/2011 | Chien | |
| 2012/0321270 A1 | 12/2012 | Imai et al. | |
| 2013/0079456 A1 * | 3/2013 | Yang | C08F 220/14 524/506 |
| 2013/0288035 A1 * | 10/2013 | Baumberg | B29C 55/00 428/221 |
| 2013/0302003 A1 | 11/2013 | Bookbinder et al. | |
| 2014/0057101 A1 * | 2/2014 | Koch | A23D 9/00 428/354 |
| 2014/0272565 A1 * | 9/2014 | Gronwald | H01M 2/145 429/211 |
| 2014/0341521 A1 | 11/2014 | Fabian et al. | |
| 2014/0341524 A1 | 11/2014 | Bookbinder et al. | |
| 2015/0168605 A1 * | 6/2015 | Ying | G02B 1/043 252/586 |
| 2015/0219845 A1 | 8/2015 | Bookbinder et al. | |
| 2015/0224045 A1 * | 8/2015 | Doan | A61Q 3/02 132/200 |
| 2015/0338555 A1 | 11/2015 | Bookbinder et al. | |

FOREIGN PATENT DOCUMENTS

| | | |
|---|---|---|
| EP | 1076250 A1 | 2/2001 |
| EP | 1743911 A1 | 1/2007 |
| EP | 2041230 B1 | 9/2010 |
| JP | 62146966 A | 6/1987 |
| JP | 2013119559 A | 6/2013 |
| KR | 2009069144 A | 6/2009 |
| RU | 2387634 C1 | 4/2010 |
| WO | 2005090488 A1 | 9/2005 |
| WO | 2008057488 A2 | 5/2008 |
| WO | 2008076285 A1 | 6/2008 |

OTHER PUBLICATIONS

Zhang, Y., et al., "Photopolymerization Behavior and Properties of Highly Branched Poly(thioether-urethane) Acrylate Used for UV-Curing Coatings" Progress in Organic Coatings, vol. 71, Issue 4, pp. 399-405, Aug. 2011.

Morell M., et. al., "Multiarm Star Poly(glycidol)-block-Poly(epsilon-caprolactone) of Different Arm Lengths and Their Use as Modifiers of Diglycidylether of Bisphenol a Thermosets." Journal of Polymer Science Part A: Polymer Chemistry, vol. 49, pp. 2395-2406, Apr. 6, 2011.

Wietor, J., et. al., "Effects of Branching and Crystallization on Rheology of Polycaprolactone Supramolecular Polymers with Ureidopyrimidinone End Groups." Macromolecules, vol. 44, No. 5, pp. 1211-1219, Feb. 4, 2011.

Liu, T., et al., "A new approach to shape memory polymer: design and preparation of poly(methyl methacrylate) composites in the presence of star poly(ethylene glycol)." Soft Matter, vol. 7, Issue 5, pp. 1641-1643, Mar. 7, 2011.

Mallucelli, G., et. al., "Photopolymerization pf poly(tetramethylene ether) glycol diacrylates and properties of the obtained networks." Polymer, vol. 37, No. 12, pp. 2565-2571, Jun. 1996.

Mallucelli, G., et. al., "Synthesis of Poly (propylene-Glycol-Diacrylates) and Properties of the Photocured Networks." Journal of Applied Polymer Science, vol. 65, Issue 3, pp. 491-497, Jul. 18, 1997.

Mallucelli, G., et. al., "Networks from poly(alkyleneglycol)-α,ω-diacrylates: Synthesis and characterization." Current Trends in Polymer Science, vol. 2, pp. 203-216, 1997.

Priola, A., et. al., "Properties of polymeric films obtained from u.v. cured poly(ethylene glycol) diacrylates." Polymer, vol. 34, No. 17, pp. 3653-3657, Sep. 1993.

Bouanga, C., et. al., "Dielectric Study of Low Glass Transition Temperature Cycloaliphatic UV-curable Epoxy Networks." IEEE Transactions on Dielectrics and Electrical Insulation, vol. 19, No. 4, pp. 1269-1282, Aug. 2012.

Noren, G. et al., "Mechanical Properties of UV-Cured Coatings Containing Multifunctional Acrylates." ACS Symposium Series, American Chemical Society, Chapter 19, pp. 258-271, Dec. 28, 1990.

Krishnan, P. et al., "Current Status of Urethane (Meth)Acrylate Oligomers and Polymers." Journal of Macromolecular Science, Part C, vol. 33, Issue 2, pp. 147-180, 1993.

(56) References Cited

OTHER PUBLICATIONS

Martin, B., "Acrylated Polyurethane Oligomers"; Journal of Radiation Curing, vol. 13, pp. 4-16, Aug. 1986.
McConnell, J. et al., "Structure-Performance Relationships of Urethane Acrylates." ACS Symposium Series, American Chemical Society, Chapter 20, pp. 258-271, Dec. 28, 1990.
Miller, H., "Acrylourethane Resin Design." Journal of Radiation Curing, vol. 11, Issue 2, pp. 4-9, May 1984.

* cited by examiner

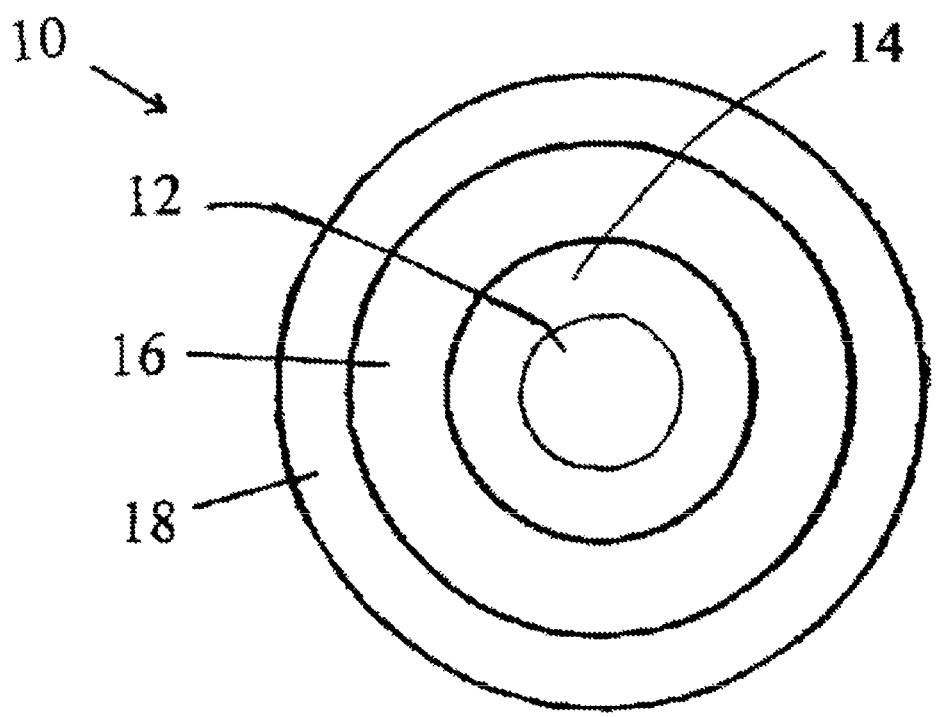

OPTICAL FIBER COATING COMPOSITIONS WITH ACRYLIC POLYMERS

This application claims the benefit of priority of U.S. Provisional Application 62/079,746 filed on Nov. 14, 2014 the content of which in incorporated herein by reference in its entirety.

FIELD

The present disclosure relates to compositions used to form coatings for optical fibers. More particularly, the present disclosure relates to coating compositions that include acrylic polymers that enhance the tensile strength of coatings formed from the compositions.

BACKGROUND

The light transmitting performance of an optical fiber is highly dependent upon the properties of the polymer coating that is applied to the fiber during manufacturing. Typically a dual-layer coating system is used where a soft primary coating is in contact with the glass fiber and a harder secondary coating surrounds the primary coating. The harder secondary coating protects the fiber from damage caused by external forces and allows the fiber to be handled without concern of breakage. The softer primary coating dissipates forces that reach the interior of the coated fiber and prevent the forces from being transferred to the fiber. The primary coating is especially important in dissipating stresses that arise when the fiber is bent. The influence of bending stresses on the fiber needs to be minimized because bending stresses create local perturbations in the refractive index profile of the glass fiber that act to attenuate the intensity of light guided by the fiber. By dissipating stresses, the primary coating minimizes bend-induced attenuation losses.

Conventionally, certain characteristics have been desirable for the primary coating. For example, the modulus of the primary coating must be sufficiently low to cushion and protect the fiber by readily relieving stresses on the fiber. This cushioning effect must be maintained throughout the fiber's lifetime. The Young's modulus of the primary coating may generally be less than about 1.0 MPa, and more preferably, less than about 0.50 MPa.

Because of differential thermal expansion properties between the primary and secondary coatings, the primary coating should also have a glass transition temperature ($T_g$) that is lower than the foreseeable lowest use temperature. This enables the primary coating to remain elastic throughout the temperature range of use, facilitating differences in the coefficient of thermal expansion between the glass fiber and the secondary coating. Further, a low glass transition temperature enables the primary coating to remain soft when the fiber is deployed in a low temperature environment. The glass transition temperature of the primary coating may be less than about 0° C. Also, the tensile strength of the primary coating, which generally decreases as the modulus decreases, must be high enough to prevent tearing defects during on draw processing or subsequent processing of the coated fiber during cabling, etc. The tensile strength of the primary coating may generally be greater than about 0.3 MPa.

SUMMARY

According to an embodiment of the present disclosure, an optical fiber coating composition is provided. The optical fiber coating composition includes a radiation-curable component, a photoinitiator, and an acrylic polymer having at least one benzophenone group.

According to another embodiment of the present disclosure, a cured product formed from an optical fiber coating composition is provided. The optical fiber coating composition includes a radiation-curable component, a photoinitiator, and an acrylic polymer having at least one benzophenone group.

According to another embodiment of the present disclosure, a coated optical fiber is provided. The coated optical fiber includes an optical fiber and a coating surrounding the optical fiber. The coating includes the cured product of a coating composition. The coating composition includes a radiation-curable component, a photoinitiator, and an acrylic polymer having at least one benzophenone group.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The disclosure will be understood more clearly from the following description and from the accompanying FIGURES, given purely by way of non-limiting example, in which:

FIG. 1 is a cross-sectional view of an optical fiber made in accordance with the present invention.

DETAILED DESCRIPTION

Reference will now be made in detail to the present embodiment(s), an example(s) of which is/are illustrated in the accompanying drawings. Whenever possible, the same reference numerals will be used throughout the drawings to refer to the same or like parts.

The singular forms "a," "an" and "the" include plural referents unless the context clearly dictates otherwise. The endpoints of all ranges reciting the same characteristic are independently combinable and inclusive of the recited endpoint. All references are incorporated herein by reference.

The present disclosure relates to a coating composition and coating for optical fibers. The coating composition may be radiation-curable and upon curing, forms a fiber coating that has low modulus and high tensile strength. The cured coating has characteristics that are suitable for use as a primary coating for optical fibers. For example, the coating composition may have a Young's modulus of less than about 1.0 MPa, and more preferably, less than about 0.50 MPa. The coating composition may also have a % elongation at break of greater than about 50%. The coating composition may also have a tensile strength of greater than about 0.30

MPa. The present disclosure also extends to a fiber coated with a coating formed from the coating composition disclosed herein.

Referring to FIG. 1, an optical fiber 10 includes a glass core 12, a cladding layer 14 surrounding and adjacent to the glass core 12, a primary coating material 16 that adheres to the cladding layer 14, and one or more secondary (or outer) coating materials 18 surrounding and adjacent to the primary coating material 16.

Any conventional material can be used to form the glass core 12, such as those described in U.S. Pat. No. 4,486,212, which is hereby incorporated by reference in its entirety. The core may be a silica glass having a cylindrical cross section and a diameter ranging from about 5.0 μm to about 10 μm for single-mode fibers and from about 20 μm to about 100 μm for multi-mode fibers. The core may also contain varying amounts of other material such as, but not limited to, oxides of titanium, thallium, germanium, and boron, which modify the core's refractive index.

The cladding layer 14 preferably has a refractive index that is less than the refractive index of the core. A variety of cladding materials, both plastic and glass (e.g., silicate and borosilicate glasses) are used in constructing conventional glass fibers. Any conventional cladding materials known in the art can be used to form the cladding layer 14 in the optical fiber of the present disclosure.

The glass core 12 and cladding layer 14, which together form the glass fiber, can be formed according to a number of processes known in the art. In many applications, the glass core 12 and cladding layer 14 have a discernable core-cladding boundary. Alternatively, the core and cladding layer can lack a distinct boundary. One such glass fiber is a step-index fiber, which may be formed by applying the cladding layer 14 as a series of glass or plastic layers of varying refractive index. Exemplary step-index fibers are described in U.S. Pat. Nos. 4,300,930 and 4,402,570, each of which is hereby incorporated by reference in its entirety. Another such fiber is a graded-index fiber, which has a core whose refractive index varies with distance from the fiber. A graded-index fiber may be formed by diffusing the glass core 12 and cladding layer 14 into one another. Exemplary graded-index fibers are described in U.S. Pat. Nos. 5,729,645, 4,439,008, 4,176,911, and 4,076,380, each of which is hereby incorporated by reference in its entirety.

The secondary coating material(s) 18 may be the polymerization (i.e., cured) product of a coating composition that contains urethane acrylate liquids whose molecules become cross-linked when polymerized. Other suitable materials for use in secondary coating materials, as well as considerations related to selection of these materials, are well known in the art and are described in U.S. Pat. Nos. 4,962,992 and 5,104,433, each of which is hereby incorporated by reference in its entirety. Various additives that enhance one or more properties of the coating can also be present, including additives incorporated in the compositions of the present disclosure.

The secondary coating materials 18 can be a tight buffer coating or, alternatively, a loose tube coating. Irrespective of the type of secondary coating employed, it is preferred that the outer surface of the secondary coating material 18 not be tacky so that adjacent convolutions of the optic fiber (i.e., on a process spool) can be unwound.

According to embodiments of the present disclosure, the coating composition may include a radiation-curable component. The radiation-curable component may include one or more radiation-curable compounds. The radiation-curable compounds may include one or more radiation-curable monomers, one or more radiation-curable oligomers, or a combination of one or more radiation-curable monomers and one or more radiation-curable oligomers. The radiation-curable monomer(s) may function as reactive diluent(s) in the coating composition and may afford control over the viscosity of the coating composition to facilitate processing. Each radiation-curable compound includes a radiation-curable functional group. The radiation-curable group may be an ethylenically unsaturated group, such as an acrylate or methacrylate group. The radiation-curable compounds may be monofunctional or multifunctional. Multifunctional radiation-curable compounds may function as crosslinking agents and may be referred to herein as "crosslinkers". Each of the monofunctional or multifunctional radiation-curable compounds may, independently, have a number average molecular weight of less than about 3000 g/mol, or less than about 2500 g/mol, or less than about 2000 g/mol, or less than about 1500 g/mol, or less than about 1000 g/mol.

The radiation-curable component may include a monofunctional or multifunctional monomer. The monomer may include a multifunctional (meth)acrylate monomer. As used herein, the term "(meth)acrylate" means acrylate or methacrylate. The monomer may include polyether (meth)acrylates, polyester (meth)acrylates, or polyol (meth)acrylates. The multifunctional monomer may be a di(meth)acrylate, tri(meth)acrylate, tetra(meth)acrylate, or higher (meth)acrylate. Monofunctional or multifunctional polyol (meth)acrylates may include mono functional or multifunctional polyalkoxy(meth)acrylates (e.g. polyethyleneglycol diacrylate, polypropylene glycol diacrylate).

Radiation-curable monomers may also include ethylenically-unsaturated compounds, ethoxylated (meth)acrylates, ethoxylated alkylphenol mono(meth)acrylates, propylene oxide (meth)acrylates, n-propylene oxide (meth)acrylates, isopropylene oxide (meth)acrylates, mono functional (meth)acrylates, monofunctional aliphatic epoxy (meth)acrylates, multifunctional (meth)acrylates, multifunctional aliphatic epoxy (meth)acrylates, and combinations thereof. The monomer component may include compounds having the general formula $R_2-R_1-O-(CH_2CH(CH_3)-O)_n-COCH=CH_2$, where $R_1$ and $R_2$ are aliphatic, aromatic, or a mixture of both, and n=1 to 10, or $R_1-O-(CH_2CH(CH_3)-O)_n-COCH=CH_2$, where $R_1$ is aliphatic or aromatic, and n=1 to 10, or $R_1-O-(CH_2CH(CH_3)-O)_n-COCH=CH_2$, where $R_1$ is aliphatic or aromatic, and n=1 to 10, or formula $R_2-R_1-O-(CH_2CH_2-O)_n-COCH=CH_2$, where $R_1$ and $R_2$ are aliphatic, aromatic, or a mixture of both, and n=1 to 10, or $R_1-O-(CH_2CH_2-O)_n-COCH=CH_2$, where $R_1$ is aliphatic or aromatic, and n=1 to 10.

Representative radiation-curable monomers include ethylenically unsaturated monomers such as ethylhexyl acrylate, lauryl acrylate (e.g., SR335, Sartomer USA (Exton, Pa.), AGEFLEX FA12, BASF, and PHOTOMER 4812, IGM Resins (St. Charles, Ill.), ethyoxylated lauryl acrylate (e.g. CD9075, Sartomer USA (Exton, Pa.), ethoxylated nonylphenol acrylate (e.g., SR504, Sartomer USA (Exton, Pa.) and PHOTOMER 4066 available from IGM Resins (St. Charles, Ill.)), caprolactone acrylate (e.g., SR495, Sartomer USA (Exton, Pa.), and TONE M-100 available from Dow Chemical), phenoxyethyl acrylate (e.g., SR339, Sartomer USA (Exton, Pa.), AGEFLEX PEA available from BASF, and PHOTOMER 4035 available from IGM Resins (St. Charles, Ill.)), isooctyl acrylate (e.g., SR440, Sartomer USA (Exton, Pa.) and AGEFLEX FA8, BASF), tridecyl acrylate (e.g., SR489, Sartomer USA (Exton, Pa.)), isobornyl acrylate (e.g., SR506, Sartomer USA (Exton, Pa.) and AGE- FLEX IBOA, CPS Chemical Co.), tetrahydrofurfuryl acrylate (e.g., SR285, Sartomer USA (Exton, Pa.)), stearyl acrylate (e.g., SR257, Sartomer USA (Exton, Pa.)), isodecyl acrylate (e.g., SR395, Sartomer USA (Exton, Pa.) and AGEFLEX FA10, BASF), 2-(2-ethoxyethoxy)ethyl acrylate (e.g., SR256, Sartomer USA (Exton, Pa.)), epoxy acrylate (e.g., CN120, Sartomer USA (Exton, Pa.), and EBECRYL 3201 and 3604, Cytec Industries Inc. (Woodland Park, N.J.)), lauryloxyglycidyl acrylate (e.g., CN130, Sartomer USA (Exton, Pa.)) and phenoxyglycidyl acrylate (e.g., CN131, Sartomer USA (Exton, Pa.)) and combinations thereof.

The radiation-curable component of the coating composition may include a multifunctional (meth)acrylate. Multifunctional (meth)acrylates are (meth)acrylates having two or more polymerizable (meth)acrylate moieties per molecule. The multifunctional (meth)acrylate may have three or more polymerizable (meth)acrylate moieties per molecule. The multifunctional (meth)acrylate may have four or more polymerizable (meth)acrylate moieties per molecule.

Examples of multifunctional (meth)acrylates include multifunctional (meth)acrylate that may have a number average molecular weight of less than about 700 g/mol, for example, but without limitation, dipentaerythritol monohydroxy pentaacrylate (e.g. PHOTOMER 4399, IGM Resins (St. Charles, Ill.)); methylolpropane polyacrylates with and without alkoxylation such as trimethylolpropane triacrylate (e.g. SR 351, Sartomer USA (Exton, Pa.), ditrimethylolpropane tetraacrylate (e.g., PHOTOMER 4355, IGM Resins (St. Charles, Ill.)); alkoxylated glyceryl triacrylates such as propoxylated glyceryl triacrylate with propoxylation being 3 or greater (e.g., PHOTOMER 4096, IGM Resins (St. Charles, Ill.)); triproplyleneglycol diacrylate (e.g. SR306, Sartomer USA (Exton, Pa.)); dipropylene glycol diacrylate (e.g. SR508, Sartomer USA (Exton, Pa.)); and erythritol polyacrylates with and without alkoxylation, such as pentaerythritol tetraacrylate (e.g., SR295, Sartomer USA (Exton, Pa.)), ethoxylated pentaerythritol tetraacrylate (e.g., SR494, Sartomer USA (Exton, Pa.)), and dipentaerythritol pentaacrylate (e.g., PHOTOMER 4399, IGM Resins (St. Charles, Ill.), and SR399, Sartomer USA (Exton, Pa.)).

A monofunctional radiation-curable monomer may be present in the coating composition at a concentration from about 10 wt % to about 60 wt %, or from about 10 wt % to about 30 wt %, or from about 30 wt % to about 60 wt %, or from about 40 wt % to about 80 wt %, or from about 60 wt % to about 80 wt %. The coating composition may include one or more monofunctional (meth)acrylate monomers in an amount from about 5.0 wt % to about 95 wt %, or from about 0 wt % to about 75 wt %, or from about 40 wt % to about 65 wt %. The coating composition may include one or more monofunctional aliphatic epoxy(meth)acrylate monomers in an amount from about 5.0 wt % to about 40 wt %, or from about 10 wt % to about 30 wt %.

The radiation-curable component of the coating composition may include an N-vinyl amide such as an N-vinyl lactam, or N-vinyl pyrrolidinone, or N-vinyl caprolactam. The N-vinyl amide monomer may be present in the radiation-curable composition at a concentration from about 0.10 wt % to about 40 wt %, or from about 2.0 wt % to about 10 wt %.

A multifunctional radiation-curable monomer may be present in the coating composition at a concentration from about 0.05 wt % to about 15 wt %, or from about 0.1 wt % to about 10 wt %, or from about 0.50 wt % to about 10 wt %, or from about 1.0 wt % to about 5.0 wt %, or from about 1.0 wt % to about 10 wt %, or from about 1.0 wt % to about 20 wt %, or from about 1.0 wt % to about 50 wt %, or from about 2.0 wt % to about 8.0 wt %, or from about 5.0 wt % to about 40 wt %, or from about 10 wt % to about 30 wt %, or from about 20 wt % to about 30 wt %.

The radiation-curable component of the coating composition may include a radiation-curable hydroxyfunctional monomer. A hydroxyfunctional monomer is a monomer that has a pendant hydroxy moiety in addition to radiation-curable functionality such as (meth)acrylate. Examples of hydroxyfunctional monomers including pendant hydroxyl groups include caprolactone acrylate (available from Dow Chemical as TONE M-100); poly(alkylene glycol) mono (meth)acrylates, such as poly(ethylene glycol) monoacrylate, poly(propylene glycol) monoacrylate, and poly(tetramethylene glycol) monoacrylate (each available from Monomer, Polymer & Dajac Labs); 2-hydroxyethyl (meth) acrylate, 3-hydroxypropyl (meth)acrylate, and 4-hydroxybutyl (meth)acrylate (each available from Aldrich (Milwaukee, Wis.).

The hydroxyfunctional monomer may be present in the coating composition in an amount between about 0.1 wt % and about 25 wt %, or in an amount between about 5.0 wt % and about 8 wt %. The use of the hydroxyfunctional monomer may decrease the amount of adhesion promoter necessary for adequate adhesion of the primary coating to the optical fiber. The use of the hydroxyfunctional monomer may also tend to increase the hydrophilicity of the primary coating. Hydroxyfunctional monomers are described in more detail in U.S. Pat. No. 6,563,996, the disclosure of which is hereby incorporated by reference in its entirety.

The total monomer content of the coating composition may be between about 5.0 wt % and about 95 wt %, or between about 30 wt % and about 75 wt %, or between about 40 wt % and about 65 wt %.

The radiation-curable component may include a radiation-curable mono functional or multifunctional oligomer. The oligomer may be a (meth)acrylate-terminated oligomer. The oligomer may include polyether acrylates (e.g., GENOMER 3456, available from Rahn USA (Aurora, Ill.)), polyester acrylates (e.g., EBECRYL 80, 584 and 657, available from Cytec Industries Inc. (Woodland Park, N.J.)), or polyol acrylates. The oligomer may be a di(meth)acrylate, tri(meth) acrylate, tetra(meth)acrylate, or higher (meth)acrylate. Polyol (meth)acrylates may include polyalkoxy(meth)acrylates or polyol(meth)acrylates. Examples include polyethylene glycol diacrylate and polypropylene glycol diacrylate.

The oligomer of the curable primary coating composition may include a soft block with a number average molecular weight ($M_n$) of about 4000 g/mol or greater. Examples of such oligomers are described in U.S. patent publication No. 2003/0123839 A1, the disclosure of which is incorporated by reference herein in its entirety. The oligomers may have flexible backbones, low polydispersities, and/or may provide cured coatings of low crosslink densities.

The oligomers may be used singly, or in combination to control coating properties. The total oligomer content of the coating composition may be between about 5.0 wt % and about 95 wt %, or between about 25 wt % and about 65 wt %, or between about 35 wt % and about 55 wt %.

According to embodiments of the present disclosure, the coating composition may also include an acrylic polymer. The acrylic polymer may include radiation cross-linkable benzophenone groups. The acrylic polymer may include chemical groups that permit self-association.

The acrylic polymer may be a polymer formed from one or more acrylic monomers. Alternatively, the acrylic polymer may be a polymer having repeat units derived from one or more acrylic monomers. As used herein, an acrylic monomer is a compound of the form given in formula (I):

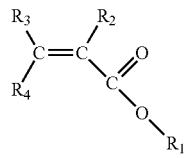

where $R_1$, $R_2$, $R_3$, and $R_4$ may be different or one or more of $R_1$, $R_2$, $R_3$, and $R_4$ may be the same. $R_1$, $R_2$, $R_3$, and $R_4$ may independently be H, an alkyl group, a linear alkyl group, a branched alkyl group, an oxygenated alkyl group (e.g. an alkyl chain including an ether linkage, an ester linkage, or a carbonyl moiety), an alkoxy group, or a tertiary amine group with the proviso that none of $R_1$, $R_2$, $R_3$, and $R_4$ includes a hydrogen-donor group, a urea group, or a urethane acrylate oligomer. $R_1$ may be an alkyl group (branched, linear, or oxygenated) and $R_2$, $R_3$, and $R_4$ are H. $R_1$ may be an alkyl group (branched, linear, or oxygenated), $R_2$ is a methyl group, and $R_3$ and $R_4$ are H. Alternatively, none of $R_1$, $R_2$, $R_3$, and $R_4$ may include an isocyanate group.

The acrylic polymer may be a homopolymer of an acrylic monomer lacking hydrogen-donor groups, urea groups, and urethane acrylate oligomers. The acrylic polymer may be a copolymer of two or more distinct acrylic monomers, each of which lacks hydrogen-donor groups, urea groups, and urethane acrylate oligomers. The copolymer may be a block copolymer or a random copolymer. The acrylic polymer formed from one or more acrylic monomers lacks hydrogen-donor groups, lacks urethane acrylate oligomers, and lacks urea groups.

The acrylic polymer may include pendant benzophenone groups bonded to the backbone of the acrylic polymer. Such acrylic polymers may be those of formula (II)

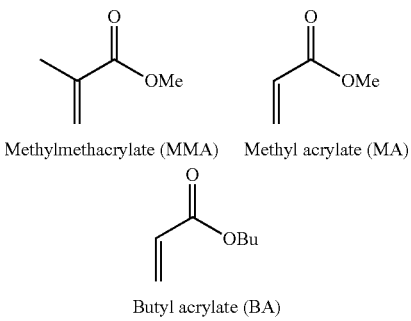

where $R^{11}$ is an organic having up to 30 carbon atoms, $R^{21}$ is a hydrogen atom or a methyl group, and $R^{31}$ is a substituted or unsubstituted phenyl group or a $C_1$-$C_4$ alkyl group. $R^{11}$ may be, for example, an alkylene group, such as, but not limited to, a $C_2$-$C_8$ alkylene group. $R^{31}$ may be, for example, a methyl group, a phenyl group, or methyl(acetophenone). Examples of such acrylic polymers are commercially available from BASF under the trade name acResin® UV.

Acrylic monomers lacking hydrogen-donor groups may have hydrogen-acceptor groups or polar groups. Hydrogen-acceptor groups may include carbonyl groups, ether groups, ester groups, or nitrogen groups. The hydrogen-acceptor or polar groups may be present along the backbone of the polymer or in pendent groups of the polymer formed from one or more acrylic monomers.

Acrylic monomers that may be used to form the acrylic polymer include alkylacrylates and alkylmethacrylates. Representative monomers lacking hydrogen-donor groups include:

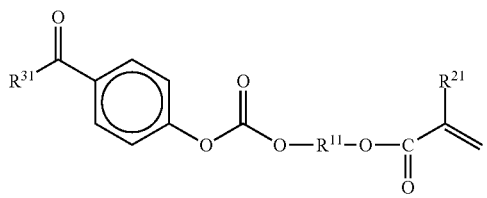

as well as ethyl(meth)acrylate, n-propyl(meth)acrylate, n-butyl(meth)acrylate, isobutyl(meth)acrylate, isopropyl (meth)acrylate, hexyl(meth)acrylate, dodecyl(meth)acrylate, 2-ethylhexyl(meth)acrylate, isobornyl(meth)acrylate. Other examples of acrylic monomers lacking hydrogen-donor groups, urea groups, and urethane acrylate oligomers include pentyl(meth)acrylate, heptyl (meth)acrylate, octyl (meth)acrylate, nonyl (meth)acrylate, decyl (meth)acrylate, undecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth) acrylate, nonadecyl (meth)acrylate, icosyl (meth)acrylate, and their corresponding structural isomers or halogated derivatives, ethylene (or propylene)glycol methyl ether (meth)acrylates, poly(ethylene (or propylene)glycol) methyl ether (meth)acrylates, benzyl (meth)acrylate, and their derivatives, acrylonitrile, N-vinylpyrrolidone and N-vinylcaprolactam. The nitrogens in N-vinylpyrrolidone and N-vinylcaprolactam may function as hydrogen-acceptor groups.

Acrylic polymers may be prepared by techniques such as free-radical polymerization, RAFT (reversible addition-fragmentation chain transfer polymerization), ATRP (atom transfer radical polymerization), living polymerization, or anionic polymerization from two or more acrylic monomers. The polymerization reaction may include an initiator and may be carried out in bulk mixtures of one or more acrylic monomers or with one or more acrylic monomers in the presence of a solvent. The polymerization reaction may also be carried out in emulsion or suspension processes in aqueous media.

When incorporated in a radiation-curable primary coating composition, the acrylic polymer may have a low glass transition temperature ($T_g$). The glass transition temperature of the acrylic polymer may be less than about 0° C., less than about −10° C., less than about −20° C., less than about −30° C., or even less than about −40° C.

The molecular weight of the acrylic polymer may be selected to maintain an acceptable viscosity of the coating composition and/or to impart a particular strength enhancement to the cured network. A high viscosity of the coating composition may inhibit processing of the coating composition. To maintain an acceptable viscosity, the number average molecular weight ($M_n$) of the acrylic polymer may be less than or equal to 100,000 and the weight average molecular weight ($M_w$) of the acrylic polymer may be less than or equal to 200,000. The number average molecular weight of the acrylic polymer may be between 5,000 g/mol and 100,000 g/mol, or between 10,000 g/mol and 80,000 g/mol, or between 20,000 g/mol and 70,000 g/mol, or between 25,000 g/mol and 60,000 g/mol. The ratio of weight average molecular weight to number average molecular weight is referred to herein as the polydispersity index. The polydispersity index of the acrylic polymer may be between 1.0 and 10, or between 2.0 and 8.5, or between 2.5 and 8.0, or between 3.0 and 7.5, or between 3.5 and 7.0.

The acrylic polymer may function as a strength additive and may provide an increase in the tensile strength of coatings formed from the present coating composition. Where the acrylic polymer includes pendant benzophenone groups bonded to the backbone of the acrylic polymer, the benzophenone groups may function to strengthen the coatings by crosslinking the acrylic polymer backbone. Where the acrylic polymer lacks radiation-curable groups, and when the acrylic polymer is otherwise non-reactive with any of the other constituents of the coating composition, the acrylic polymer may not be chemically incorporated into the network formed from the composition upon curing. When the acrylic polymer lacks hydrogen-donor groups, the acrylic polymer lacks the strength-enhancing hydrogen bonding interactions of the type observed in conventional urethane/urea-based coating systems.

In the present coating composition, the acrylic polymer may be expected to interact with the cured network through physical mechanisms. Without wishing to be bound by theory, it is believed that the acrylic polymer may become entangled with or may form physical crosslinks within the cured network. It is further believed that such physical interactions impart mechanical strength to the network. In one embodiment, none of the constituents of the coating composition include hydrogen-donor groups, none of the constituents of the coating composition react with the acrylic polymer, and the mechanism of interaction of the acrylic polymer with the cured network is essentially purely physical.

It is believed that an acrylic polymer may become dispersed in the polymer network formed when the radiation-curable components of the coating composition react with one another during curing. Dispersal of the acrylic polymer may provide physical entanglements or other physical interactions that act to increase the strength of the coating. The chemical compatibility of the acrylic polymers with common radiation-curable mono functional and multifunctional (meth)acrylate monomers, oligomers, and crosslinkers leads to high solubility of the present acrylic polymers in most acrylate-based coating compositions. The high solubility permits incorporation of high concentrations of the acrylic polymer in the coating formulation and affords a wider range of control over the properties of cured coatings formed from the coating formulations. Unlike the thermoplastic urethane elastomers, the present acrylic polymers are soluble in a wide range of radiation-curable acrylate coating compositions. Coating compositions need not be limited to highly polar or non-polar radiation-curable (meth)acrylate components and may include (meth)acrylate components of intermediate or moderate polarity. The present acrylic polymers are readily soluble, for example, in the radiation-curable monomer diluent ethoxylated (4) nonylphenol acrylate, which is known to facilitate fast curing of coating compositions.

The acrylic polymer may be present in the coating composition in an amount from about 5.0 wt % to about 70 wt %, or from about 5.0 wt % to about 60 wt %, or from about 5.0 wt % to about 50 wt %, or from about 5.0 wt % to about 40 wt %, or from about 5.0 wt % to about 30 wt %, or from about 10 wt % to about 50 wt %, or from about 10 wt % to about 40 wt %, or from about 10 wt % to about 30 wt %, or from about 10 wt % to about 25 wt %, or from about 15 wt % to about 30 wt %.

The coating composition may also include a photoinitiator. The photoinitiator may initiate curing of the coating composition upon exposure to UV radiation. Suitable photoinitiators for the coating composition include 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenylacetophenone (e.g., IRGACURE 651, available from BASF); bis(2,4,6-trimethylbenzoyl)-phenylphosphine oxide (IRGACURE 819); (2,4,6-trimethylbenzoyl)diphenyl phosphine oxide (LUCIRIN TPO, available from BASF); ethoxy(2,4,6-trimethylbenzoyl)-phenylphosphine oxide (LUCIRIN TPO-L from BASF); and combinations thereof. The photoinitiator may be present in an amount from about 0.50 wt % to about 5.0 wt %, or from about 1.0 wt % to about 3.0 wt %.

In one embodiment, the coating composition includes about 5.0 wt % to about 70 wt % of one or more acrylic polymers, about 10 wt % to about 60 wt % of one or more monofunctional (meth)acrylate monomers, about 5.0 wt % to about 40 wt % of one or more multifunctional (meth)acrylate monomers, and about 0.50 wt % to about 5.0 wt % of photoinitiator.

In another embodiment, the coating composition may include about 10 wt % to about 50 wt % of one or more acrylic polymers, about 30 wt % to about 60 wt % of one or more monofunctional (meth)acrylate monomers, about 10 wt % to about 30 wt % of one or more multifunctional (meth)acrylate monomers (or oligomers), and about 0.50 wt % to about 5.0 wt % of photo initiator.

In another embodiment, the coating composition may include about 10 wt % to about 30 wt % of one or more acrylic polymers, about 30 wt % to about 60 wt % of one or more monofunctional (meth)acrylate monomers, about 20 wt % to about 30 wt % of one or more multifunctional (meth)acrylate monomers (or oligomers), and about 0.50 wt % to about 5.0 wt % of photo initiator.

In yet another embodiment, the coating composition may include about 10 wt % to about 40 wt % of one or more acrylic polymers, about 40 wt % to about 80 wt % of one or more mono functional (meth)acrylate monomers, about 1.0 wt % to about 20 wt % of one or more multifunctional (meth)acrylate monomers (or oligomers), and about 0.50 wt % to about 5.0 wt % of photo initiator.

In still another embodiment, the coating composition may include about 15 wt % to about 30 wt % of one or more acrylic polymers, about 60 wt % to about 80 wt % of one or more mono functional (meth)acrylate monomers, about 1.0 wt % to about 10 wt % of one or more multifunctional (meth)acrylate monomers (or oligomers), and about 0.50 wt % to about 5.0 wt % of photo initiator.

The coating composition may lack urethane acrylate oligomers, urea groups, and hydrogen-donor groups. The coating composition may also lack isocyanate groups, urethane acrylate oligomers, urea groups, and hydrogen-donor groups. The cured coating formed from the present coating composition may lack hydrogen-donor groups, urea groups, and urethane acrylate oligomers. The cured coating formed from the present coating composition may lack hydrogen-donor groups, urea groups, urethane acrylate oligomers, and isocyanate groups.

The coating composition may optionally include one or more non-radiation-curable constituents in addition to a non-radiation-curable acrylic polymer. The one or more optional non-radiation-curable constituents may include linear or branched urethane oligomers of the type shown in formula (IIIa) or (IIIb) below:

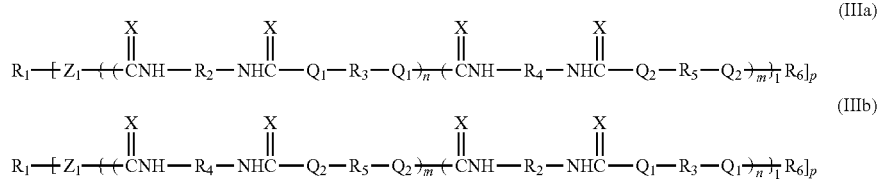

in which,
- $R_1$ is a core moiety of a multifunctional reactant, where the number of functional groups of the core moiety is defined by p, where p is 2 or greater;
- each X is independently S or O;
- $Z_1$ is —O—, —S—, —N(H)—, or —N(alkyl)-;
- each of $Q_1$ and $Q_2$ is independently —O—, —S—, —N(H)—, or —N(alkyl)-;
- each of $R_2$ and $R_4$ is a core moiety of a di(thio)isocyanate reactant;
- $R_3$ is a core moiety of a polyol or amine-capped polyol reactant;
- $R_5$ is a hydrocarbon or oxygen-containing hydrocarbon having an average molecular weight of between about 28 to about 400;
- $R_6$ is represented by the structure according to formula (IV) or (V)

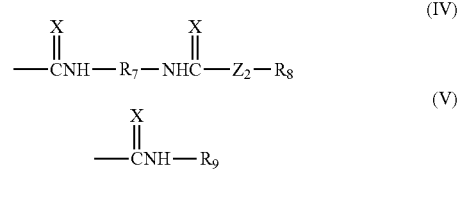

where X is defined as above, $Z_2$ is —O—, —S—, —N(H)—, or —N(alkyl)-, $R_7$ is a core moiety of a di(thio)isocyanate reactant, $R_8$ is a non-radiation curable capping agent, and $R_9$ is a core moiety of an isocyanate or thioisocyanate reactant;
- l is 1 to 6;
- m is greater than or equal to 0, preferably 1 to 4, more preferably 1 to 3; and
- n is greater than or equal to 1, preferably 2 to 10, more preferably 2 to 6.

The core moiety ($R_1$) present in the non-radiation curable component may be the reaction product of a multifunctional core reactant. The functional groups can be hydroxyl groups or amino groups. The multifunctional core reactant may be a polyol or an amine-capped polyol. Examples of these core reactants and their number of functional groups (p) include, without limitation, glycerol, where p=3; trimethylol propane, where p=3; pentaerythritol, where p=4; ditrimethylol propane, where p=4; ethylenediamine tetrol, where p=4; xylitol, where p=5; dipentaerythritol, where p=6; sucrose and other disaccharides, where p=8; alkoxylated derivatives thereof; dendrimers where p is from about 8 to about 32, such as poly(amidoamine) (PAMAM) dendrimers with G1 (p=8), G2 (p=16), or G3 (p=32) amine groups or PAMAM-OH dendrimers with G1 (p=8), G2 (p=16), or G3 (p=32) hydroxyl groups; and combinations thereof.

$R_2$, $R_4$, and $R_7$ independently represent the core moiety of a di(thio)isocyanate reactant. This includes both diisocyanates and dithioisocyanates, although diisocyanates are preferred. Although any diisocyanates and dithioisocyanates can be used, preferred $R_2$, $R_4$, and $R_7$ core groups of these diisocyanates and dithioisocyanates include the following:

| Reactant Name | $R_2$ or $R_4$ or $R_7$ Core Moiety |
|---|---|
| 4,4'-methylene bis(cyclohexyl) diisocyanate (HMDI) | |
| toluene diisocyanate (TDI) | |
| Isophorone diisocyanate (IPDI) | |

-continued

| Reactant Name | $R_2$ or $R_4$ or $R_7$ Core Moiety |
|---|---|
| Tetramethyl-1,3-xylylene diisocyanate (XDI) | 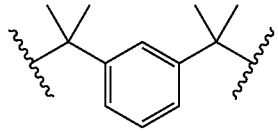 [SMILES: *C(C)(C)c1cccc(C(*)(C)C)c1] |
| 4,4'-methylene bis(phenyl) diisocyanate (MDI) | 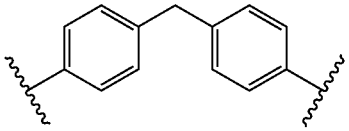 [SMILES: *c1ccc(Cc2ccc(*)cc2)cc1] |
| p-phenylene diisocyanate (PDI) | 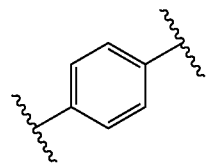 [SMILES: *c1ccc(*)cc1] |
| Alkyl diisocyanates | —$(CH_2)_q$— where q is 2 to 12, preferably 6 |

$R_3$ is a core moiety of a polyol or amine-capped polyol reactant that preferably has a number average molecular weight of greater than or equal to about 400. The polyol or amine-capped polyol may have a number average molecular weight between about 1000 and about 9000, between about 2000 and 9000, or between about 4000 and 9000. Examples of suitable $R_3$-forming polyols include, without limitation, polyether polyols such as poly(propylene glycol) [PPG], poly(ethylene glycol) [PEG], poly(tetramethylene glycol) [PTMG] and poly(1,2-butylene glycol); polycarbonate polyols; polyester polyols; hydrocarbon polyols such as hydrogenated poly(butadiene) polyols; amine-capped derivatives of these polyols, and any combinations thereof.

$R_5$ is a hydrocarbon or oxygen-containing hydrocarbon, which is preferably saturated, and has an average molecular weight of between about 28 to about 400. Thus, $R_5$ is the core moiety of a low molecular weight diol (to form urethane linkages) or diamine (to form urea linkages) reactant that acts analogously to a chain extender in a polyurethane. Exemplary reactants include, without limitation, 1,4-butanediol, 1,6-butanediol, ethylene diamine, 1,4-butanediamine, and 1,6-hexanediamine. As noted above, these chain extender based urethane orbutanediamine, urea groups are expected to result in "hard block" areas along the block moiety branch(es) that promote more effective hydrogen bonding branch interactions than would the simple urethane (or urea) linkages resulting from polyol (or amine capped polyol)/isocyanate links. Where m is 0, the hard block is not present.

$R_8$ is the reaction product of a non-radiation curable capping agent, which caps the reactive isocyanate group at the end of a block moiety branch. These agents are preferably monofunctional alcohols (or amines) that will react with residual isocyanate groups at the end of a branch. Examples of these reactants include, without limitation, 1-butanol, 1-octanol, poly(propylene glycol)monobutyl ether, and 2-butoxyethanol.

$R_9$ is a core moiety of an (thio)isocyanate reactant. Any suitable mono-functional (thio)isocyanate can be used for this purpose. Exemplary (thio)isocyanate reactants that can serve as non-reactive capping agent for an arm of the component include, without limitation, methyl isocyanate, ethyl isocyanate, n-propyl isocyanate, i-propyl isocyanate, n-butyl isocyanate, i-butyl isocyanate, n-pentyl isocyanate, n-hexyl isocyanate, n-undecylisocyanate, chloromethyl isocyanate, β-chloroethyl isocyanate, γ-chloropropyl isocyanate, ethoxycarbonylmethyl isocyanate, β-ethoxyethyl isocyanate, α-ethoxyethyl isocyanate, α-butoxyethyl isocyanate, α-phenoxyethylisocyanate, cyclopentyl isocyanate, cyclohexyl isocyanate, methyl isothiocyanate, and ethyl isothiocyanate.

The one or more optional non-radiation-curable components of the present composition may include non-radiation-curable acrylic polymers having hydrogen-donor groups. The coating composition may include one or more acrylic polymers having hydrogen-donor groups in combination with one or more acrylic polymers lacking hydrogen-donor groups. The hydrogen-donor groups may further contribute to the strength of the cured composition through hydrogen bonding interactions with the cured network or with the acrylic polymer lacking hydrogen-donor groups. Acrylic polymers with hydrogen-donor groups incorporate one or more acrylic monomers having a hydrogen-donor group. The monomers may include acrylamides. The monomers may include (meth)acrylate monomers that include a substituent with a hydrogen-donor group. Hydrogen bond donor groups may include N—H, O—H or —$CO_2H$ groups. The hydrogen-donor groups may be present along the backbone of the polymer formed from the monomers or in pendent groups of the polymer formed from the monomers.

The optional acrylic polymers with hydrogen-donor groups may also be copolymers formed from two or more acrylic monomers, where at least one of the acrylic monomers includes a hydrogen-donor group and at least one of the acrylic monomers lacks a hydrogen-donor group. Monomers lacking a hydrogen-donor group include (meth)acrylate monomers lacking substituents with hydrogen-donor groups. The optional acrylic polymer with hydrogen-donor group may be a copolymer formed from an acrylic monomer with a hydrogen-donor group and an acrylic monomer without a hydrogen-donor group. The copolymer may be a random copolymer, block copolymer, or other copolymer.

Acrylic monomers with hydrogen-donor groups include (meth)acrylamides, N-vinyl (meth)acrylamides, N-vinyl amide, (meth)acrylic acid, or α, β-unsaturated lactones and amides. Representative examples include:

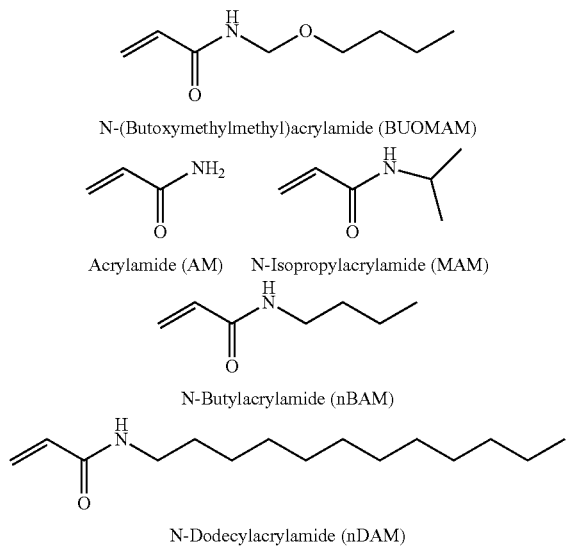

N-(Butoxymethylmethyl)acrylamide (BUOMAM)

Acrylamide (AM)    N-Isopropylacrylamide (MAM)

N-Butylacrylamide (nBAM)

N-Dodecylacrylamide (nDAM)

Other monomers with hydrogen-donor groups that may be included in the optional polymer (or copolymer) with hydrogen-donor groups stronger interactions include: N,N-dialkyl (meth)acrylamide; α, β-unsaturated monomers with a hydrogen bond donor group including (1) α, β-unsaturated amides: acrylamide (or methacrylamide): for example, N-methyl acrylamide (or methacrylamide), N-ethyl acrylamide (or methacrylamide), N-propyl acrylamide (or methacrylamide), N-butyl acrylamide (or methacrylamide), N-pentyl acrylamide (or methacrylamide), N-hexyl acrylamide (or methacrylamide), N-heptanyl acrylamide (or methacrylamide), N-octyl acrylamide (or methacrylamide), N-nonyl acrylamide (or methacrylamide), N-decyl acrylamide (or methacrylamide), N-undecyl acrylamide (or methacrylamide), N-dodecyl acrylamide (or methacrylamide), N-tridecyl acrylamide (or methacrylamide), N-tetradecyl acrylamide (or methacrylamide), N-pentadecyl acrylamide (or methacrylamide), N-hexadecyl acrylamide (or methacrylamide), N-heptadecyl acrylamide (or methacrylamide), N-octadecyl acrylamide (or methacrylamide), N-nonadecyl acrylamide (or methacrylamide), N-icosyl acrylamide (or methacrylamide), and their corresponding structural isomers, N-(Butoxymethyl)acrylamide, N-(hydroxymethyl) acrylamide; 2) acrylic acid and carboxylate-functionalized α, β-unsaturated esters: for example, 2-carboxyethyl acrylate; and (3) hydroxyl-functionalized α, β-unsaturated esters: for example, hydroxypropyl acrylate, 4-hydroxybutyl acrylate.

Additionally, the coating composition may include an acrylic polymer lacking hydrogen-donor groups, urea groups, and urethane acrylate oligomers in combination with a monomer that includes hydrogen-donor groups, where the monomer with hydrogen-donor groups lacks urea groups and urethane acrylate oligomers. Optional monomers with hydrogen-donor groups that lack urea groups and urethane acrylate oligomers include those mentioned hereinabove. Optional monomers with hydrogen-donor groups may be radiation-curable and may become incorporated in the cured network.

In addition to the radiation-curable component(s) (which may include one or more mono functional or multifunctional monomer(s), oligomer(s), and crosslinkers as described hereinabove), acrylic copolymer(s), and polymerization initiator(s), the curable coating composition may include other additives such as an adhesion promoter, a strength additive, a reactive diluent, an antioxidant, a catalyst, a stabilizer, an optical brightener, a property-enhancing additive, an amine synergist, a wax, a lubricant, and/or a slip agent. Some additives may operate to control the polymerization process, thereby affecting the physical properties (e.g., modulus, glass transition temperature) of the cured coating formed from the radiation-curable composition. Other additives may affect the integrity of the cured coating formed from the coating composition (e.g., protect against de-polymerization or oxidative degradation).

EXAMPLES

A series of coating compositions consistent with the present description were prepared that incorporated an acrylic polymer. In addition to the acrylic polymer, the compositions included one or more radiation-curable mono functional acrylates, a radiation-curable multifunctional acrylate, and a photoinitiator. Some compositions included one or more additional additives or components.

The constituents of representative exemplary coating compositions are listed in Table I. Each composition is identified by a separate reference numeral. In Table I, the weight percent of each constituent is given by the number in parenthesis. In Table I, PnBa is poly(butyl acrylate), A1, A2, A3 and A4 are acrylic polymers having pendant benzophenone groups commercially available from BASF under the trade name acResin® UV; SR504 is ethoxylated (4) nonyl phenol acrylate (Sartomer USA), IBOA is isobornyl acrylate (Sartomer USA), TPO is 2,4,6-trimethylbenzoyldiphenylphosphine oxide (BASF); SR495 is caprolactone acrylate (Sartomer USA); CD9075 is tetraethoxylated lauryl acrylate (Sartomer USA); SR508 is dipropylene glycol diacrylate (Sartomer USA); SR306 is tripropylene glycol diacrylate (Sartomer USA); SR351 is trimethylolpropane triacrylate (Sartomer USA); and NVC is N-vinyl caprolactam.

TABLE I

Illustrative Coating Compositions

| Ref. No. | Acrylic Polymer | Monofunctional Acrylate(s) | Multifunctional Acrylate | Photoinitiator |
|---|---|---|---|---|
| 1 | PnBa (20) | SR504 (62) IBOA (14) | SR351 (1) | TPO (3) |
| 2 | A1 (20) | SR504 (62) IBOA (14) | SR351 (1) | TPO (3) |
| 3 | A3 (20) | SR504 (62) IBOA (14) | SR351 (1) | TPO (3) |
| 4 | A2 (20) | SR504 (62) IBOA (14) | SR351 (1) | TPO (3) |
| 5 | A4 (20) | SR504 (62) IBOA (14) | SR351 (1) | TPO (3) |
| 6 | PnBa (20) | SR504 (62) IBOA (14) | SR508 (1) | TPO (3) |
| 7 | A3 (20) | SR504 (62) IBOA (14) | SR508 (1) | TPO (3) |
| 8 | A3 (20) | SR504 (62.5) IBOA (14) | SR508 (0.50) | TPO (3) |
| 9 | A3 (20) | SR504 (62) IBOA (13) | SR351 (2) | TPO (3) |
| 10 | A3 (20) | SR504 (62) IBOA (12) | SR351 (3) | TPO (3) |

TABLE I-continued

Illustrative Coating Compositions

| Ref. No. | Acrylic Polymer | Monofunctional Acrylate(s) | Multifunctional Acrylate | Photoinitiator |
|---|---|---|---|---|
| 11 | A3 (20) | SR504 (62) IBOA (11) | SR351 (4) | TPO (3) |
| 12 | A3 (20) | SR504 (62) IBOA (10) | SR351 (5) | TPO (3) |
| 13 | A3 (15) | SR504 (58) IBOA (14) SR495 (5) | SR508 (5) | TPO (3) |
| 14 | A3 (20) | SR504 (53) IBOA (14) SR495 (5) | SR508 (5) | TPO (3) |
| 15 | A3 (25) | SR504 (48) IBOA (14) SR495 (5) | SR508 (5) | TPO (3) |
| 16 | A3 (20) | SR504 (52) IBOA (14) SR495 (5) | SR508 (6) | TPO (3) |
| 17 | A3 (20) | SR504 (32) CD9075 (20) IBOA (14) SR495 (5) | SR508 (6) | TPO (3) |
| 18 | A3 (25) | SR504 (48) IBOA (14) SR495 (5) | SR508 (5) | TPO (3) |
| 19 | A3 (25) | SR504 (44) IBOA (14) SR495 (5) | SR508 (9) | TPO (3) |
| 20 | A3 (25) | SR504 (44) IBOA (14) SR495 (5) | SR508 (9) | TPO (3) |
| 21 | PnBa (25) | SR504 (44) IBOA (14) SR495 (5) | SR508 (9) | TPO (3) |
| 22 | A3 (25) | SR504 (58) SR495 (5) | SR306 (9) | TPO (3) |
| 23 | A3 (25) | SR504 (58) NVC (5) | SR306 (9) | TPO (3) |
| 24 | A3 (30) | SR504 (53) SR495 (5) | SR306 (9) | TPO (3) |

Coatings in the form of cured films were formed from the compositions given in Table I. The cured films were prepared with the listed components using commercial blending equipment. Each coating composition was prepared by combining all components except for the TPO photoinitiator and, if present, Irg1035 anti-oxidant and APTMS adhesion promoter. The components were weighed into a jacketed beaker and heated to between about 60° C. and about 70° C. Blending was continued until a homogeneous mixture was obtained. TPO was then weighed and added to the beaker (along with Irg1035 and APTMS in coating compositions that included those additives). Blending was then continued until a homogeneous mixture was obtained. Films were prepared by drawing down the blended compositions on a glass plate using a 5.0 mil draw down bar. Films were cured using a Fusion D lamp with a nitrogen purge. The films received a dose of approximately 1350 mJ/cm$^2$. All samples were allowed to condition overnight in a controlled environment at about 23° C. and about 50% relative humidity.

The Young's modulus, tensile strength and % elongation at break of cured films formed from the coating compositions were measured. Tensile properties were measured using a Sintech MTS tensile tester. Tensile tests followed ASTM882-97. The gauge length used for testing was 5.1 cm and the test speed was 2.5 cm/minute. Tensile strength, % elongation at break, and Young's Modulus values were recorded.

The properties of the cured films are summarized in Table II below, respectively, for the coating compositions listed in Table I. The films are labeled by the reference numerals of the coating compositions from which they were prepared. The reference numerals in Table II correspond with those listed in Table I. The property measurements for the cured films are consistent with properties desired in primary fiber coatings.

TABLE II

Properties of Cured Films

| Ref. No. | Tensile Strength (MPa) | Elongation (%) | Young's Modulus (MPa) |
|---|---|---|---|
| 1 | 0.25 ± 0.11 | 42 ± 10 | 0.71 ± 0.27 |
| 2 | 0.21 ± 0.03 | 80 ± 7 | 0.37 ± 0.06 |
| 3 | 0.27 ± 0.07 | 112 ± 10 | 0.47 ± 0.13 |
| 4 | 0.21 ± 0.04 | 117 ± 7 | 0.35 ± 0.06 |
| 5 | 0.26 ± 0.03 | 119 ± 10 | 0.42 ± 0.08 |
| 6 | 0.06 ± 0.01 | 47 ± 12 | 0.16 ± 0.03 |
| 7 | 0.17 ± 0.01 | 141 ± 11 | 0.23 ± 0.05 |
| 8 | 0.14 ± 0.03 | 143 ± 12 | 0.21 ± 0.05 |
| 9 | 0.24 ± 0.04 | 98 ± 8 | 0.47 ± 0.09 |
| 10 | 0.37 ± 0.05 | 76 ± 6 | 0.38 ± 0.02 |
| 11 | 0.46 ± 0.08 | 70 ± 3 | 0.51 ± 0.04 |
| 12 | 0.64 ± 0.12 | 60 ± 5 | 0.83 ± 0.09 |
| 13 | 0.20 ± 0.05 | 36 ± 9 | 0.58 ± 0.04 |
| 14 | 0.23 ± 0.06 | 57 ± 12 | 0.37 ± 0.01 |
| 15 | 0.32 ± 0.05 | 88 ± 7 | 0.24 ± 0.01 |
| 16 | 0.23 ± 0.04 | 59 ± 8 | 0.34 ± 0.02 |
| 17 | 0.23 ± 0.02 | 65 ± 4 | 0.26 ± 0.01 |
| 18 | 0.32 ± 0.05 | 88 ± 7 | 0.24 ± 0.01 |
| 19 | 0.51 ± 0.15 | 58 ± 7 | 0.72 ± 0.08 |
| 20 | 0.59 ± 0.15 | 58 ± 4 | 0.76 ± 0.04 |
| 21 | 0.22 ± 0.11 | 31 ± 15 | 0.60 ± 0.10 |
| 22 | 0.38 ± 0.06 | 52 ± 5 | 0.72 ± 0.06 |
| 23 | 0.38 ± 0.04 | 50 ± 7 | 0.76 ± 0.06 |
| 24 | 0.38 ± 0.08 | 56 ± 8 | 0.54 ± 0.03 |

Coatings including acrylic polymers having pendant benzophenone groups exemplified characteristics that are suitable for use as a primary coating for optical fibers. Comparative coatings (Ref. Nos. 1, 6 and 21) were prepared by replacing the acrylic polymers having pendant benzophenone groups with PnBa, an acrylic polymer that does not have pendant benzophenone groups.

As shown in Table II, all coatings had a Young's modulus of less than 1.0 MPa. However, only coatings including acrylic polymers having pendant benzophenone groups had a Young's modulus of less than 0.50 MPa. In particular, Ref. Nos. 2-10 and 14-18 had a Young's modulus of less than 0.50 MPa. None of the comparative coatings had a Young's modulus of less than 0.50 MPa.

Also shown in Table II, only coatings including acrylic polymers having pendant benzophenone groups had a % elongation at break of greater than 50%. In particular, Ref. Nos. 2-5, 7-12, 14-20 and 22-24 had a % elongation at break of greater than 50%. Of those coatings, Ref. Nos. 3-5 and 7-8 had a % elongation at break of greater than 100%. None of the comparative coatings had a % elongation at break of greater than 50%.

Also shown in Table II, only coatings including acrylic polymers having pendant benzophenone groups had a tensile strength of greater than 0.30 MPa. In particular, Ref. Nos. 10-12, 15, 18-20, 21-24 had a tensile strength of greater than 0.30 MPa. None of the comparative coatings had a tensile strength of greater than 0.30 MPa.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A coated optical fiber comprising:
    an optical fiber;
        a coating surrounding the optical fiber, the coating comprising the cured product of a coating composition comprising:
        a radiation-curable component;
        a photoinitiator; and
        an acrylic polymer having at least one benzophenone group.

2. The cured product of claim 1, wherein the acrylic polymer has a glass transition temperature ($T_g$) of less than about 0° C.

3. The cured product of claim 1, wherein the radiation-curable component comprises a multifunctional selected from the group consisting of a di(meth)acrylate monomer, a tri(meth)acrylate monomer, a tetra(meth)acrylate, and mixtures thereof.

4. The cured product of claim 1, wherein the multifunctional monomer has a molecular weight of less than about 700 g/mol.

5. The cured product of claim 1, wherein the acrylic polymer is free of urethane acrylate oligomers.

6. The cured product of claim 1, wherein the radiation-curable component comprises a monofunctional monomer.

7. The cured product of claim 1, wherein the optical fiber coating composition comprises between about 5.0 wt % to about 70 wt % acrylic polymer.

8. The cured product of claim 1, comprising a glass transition temperature ($T_g$) of less than about 0° C.

9. The cured product of claim 1, comprising a Young's modulus of less than about 1.0 MPa.

10. The cured product of claim 1, comprising a percent elongation at break of greater than about 50%.

11. The cured product of claim 1, comprising a tensile strength of greater than about 0.30 MPa.

12. The cured product of claim 1, wherein the product is applied to the optical fiber as an inner coating.

* * * * *